UNITED STATES PATENT OFFICE 2,299,139

LUBRICANT

Corydon M. Grafton, Grosse Pointe, Mich., assignor to United States Rubber Company, New York, N. Y., a corporation of New Jersey No Drawing. Application April 10, 1941, Serial No. 387,864

7 Claims. (Cl. 252—34)

This invention relates to lubricants and in particular it relates to a lubricant for application to the bead portions of pneumatic tires for the purpose of facilitating mounting of tires on rims. More particularly the invention relates to a non-flowing, slippery and stable rubber to metal lubricant.

Since the adoption of the conventional type drop-center rim, automotive manufacturers have been faced with the problem of assembling tires on rims which includes the forcing of the tire bead portion over the rim flange. In most cases there is a relatively tight fit in moving the tire beads over the rim flange. To facilitate the assembly operation, it has been customary for the automotive manufacturer to apply a lubricant to the bead portions of the tire in the nature of a soap solution, such as a potash oil soap solution. This conventional type of lubricant is applied quickly with a brush, cloth or sponge, with the result that the lubricant frequently drips and spills on the outside and on the inside of the tire carcass. In many cases the soap solution runs down on the inside of the tire casings forming streaks which extend radially of the tire. These deposits on the tire, when dry, form a film which possesses electrically conducting characteristics. Static electricity frequently discharges from the tire tread to the vehicle through the conducting soap solution film. Due to the flexing of the tire while in operation, the film of soap solution becomes cracked and as static is discharged along the path of the film, minute static sparks jump across these cracks. On the inside of the tire casing, the inner tube lies in direct contact with the streaks of soap film. The minute static sparks which occur in this region generate ozone which is detrimental to rubber composition. As a result cracks are formed in the inner tube and premature failure of the tube often results.

Among the objects of my invention are to provide a lubricant which is particularly effective between rubber and metal; which has a sufficiently high viscosity to prevent flowing and thereby limit itself to the area of application and not run inside the tire casing; which will dry quickly; which provides a good lubricant in either the wet or dry state; which does not harm the rubber and is a rust inhibitor on iron or steel; which is not stringy; and which may be formed of relatively cheap materials. Other objects will be apparent from the following description.

A tire bead lubricant which is particularly advantageous is formed by a combination of the following ingredients:

| | Parts by weight |
|---|---|
| Potato starch | 2 |
| Triethanolamine oleate | 6 |
| Ortho phenyl phenol (preservative) | 0.1 |
| Water | 100 |

The preservative is added to hot water and the starch is next added in the form of a cold paste. The triethanolamine oleate is previously prepared from triethanolamine and oleic acid and added to the mixture which is stirred until it assumes a smooth consistency.

The above materials, when mixed as indicated, will result in a lubricant having a viscosity 75° F. in the order of 1000 Saybolt seconds. This, however, can be diluted so that its viscosity will be in the order of 200 Saybolt seconds. Other hydrophilic jelling or thickening agents may be used in place of the potato starch. For example, the following materials may be used in the above example as a substitute for the potato starch: karaya gum, locust bean gum, sodium alginate, gum tragacanth, irish moss, argar, gelatin or bentonite. Other lubricant bases may also be employed for the triethanolamine oleate such as potash soaps, e. g., potash-corn oil soap, potash-soya bean oil soap, sulfonated oils, e. g., sulfonated castor oil, diglycol oleate, or organic soap-like materials such as high molecular weight sufonated fatty alcohols, e. g., sodium lauryl sulfonate, sodium oleyl sulfonate. The chosen thickening agent should be compatible with the chosen lubricating agent. For example, where starch will not thicken in potash soap solution, karaya gum, or locust bean gum will function as thickening agents in potash soap solutions.

Another example of a lubricant which performs satisfactorily is as follows:

| | Parts in weight |
|---|---|
| Potato starch | 1.7 |
| Triethanolamine oleate | 4.5 |
| Oleic acid | 1.5 |
| Preservative | 0.1 |
| Water | 100.0 |

In this example an excess of higher fatty acid is used over that required for neutrality, in that oleic acid has been substituted for part of the triethanolamine oleate to provide an increased jelling action and therefore the amount of starch can be reduced.

As thus described it is believed obvious that I have provided an improved lubricating material of high quality particularly adapted for use on rubber or between rubber and metal, and while I have described the invention with particular relationship to the mounting of pneumatic tires, it is to be understood that the lubricant is equally adaptable for other purposes such as inserting metal shafts in rubber bushings, or rubber cores in metal bushings.

The invention is susceptible of those modifications which appear within the spirit of the invention and scope of the appended claims.

Having thus described my invention, what I claim and desire to protect by Letters Patent is:

1. A rubber to metal high viscosity lubricant comprising an ethanolamine soap as the major non-aqueous ingredient in admixture with a hydrophilic colloid thickening agent which is compatible therewith and present in amount sufficient to form a substantially non-flowing aqueous solution with said soap.

2. A rubber to metal high viscosity lubricant comprising a triethanolamine soap as the major non-aqueous ingredient in admixture with a hydrophilic colloid thickening agent which is compatible therewith and present in amount sufficient to form a substantially non-flowing aqueous solution with said soap.

3. A rubber to metal high viscosity lubricant comprising an ethanolamine soap as the major non-aqueous ingredient in admixture with free higher fatty acid, and a hydrophilic colloid thickening agent which is compatible therewith and present in amount sufficient to form a substantially non-flowing aqueous solution with said soap.

4. A rubber to metal high viscosity lubricant comprising an ethanolamine soap as the major non-aqueous ingredient in admixture with starch present in amount sufficient to form a substantially non-flowing aqueous solution with said soap.

5. A rubber to metal high viscosity lubricant comprising a triethanolamine soap as the major non-aqueous ingredient in admixture with starch present in amount sufficient to form a substantially non-flowing aqueous solution with said soap.

6. A rubber to metal high viscosity lubricant comprising an ethanolamine soap as the major non-aqueous ingredient in admixture with free higher fatty acid, and starch present in amount sufficient to form a substantially non-flowing aqueous solution with said soap.

7. A tire bead lubricant having sufficiently high viscosity and non-flowing characteristics whereby to limit itself substantially to the area of its application and thereby avoid running inside the tire casing, comprising a water soluble lubricant base composed of an ethanolamine soap in admixture with starch present in amount sufficient to form a substantially non-flowing aqueous solution with said soap base.

CORYDON M. GRAFTON.